United States Patent

[11] 3,542,048

[72] Inventor Ronald E. Bowles
12712 Meadowood Drive, Silver Spring, Maryland 20904
[21] Appl. No. 676,262
[22] Filed Oct. 18, 1967
[45] Patented Nov. 24, 1970

[54] SELF-ADAPTIVE SYSTEMS
10 Claims, 7 Drawing Figs.
[52] U.S. Cl. ................................................ 137/81.5
[51] Int. Cl. ................................................ F15c 1/12
[50] Field of Search ........................................ 137/81.5;
73/505, 515, 516, 180(In part)

[56] References Cited
UNITED STATES PATENTS

| | | | |
|---|---|---|---|
| 2,987,273 | 6/1961 | Wannamaker et al. | 73/505X |
| 3,206,974 | 9/1965 | Andresen | 73/180X |
| 3,320,815 | 5/1967 | Bowles | 73/505 |
| 3,327,529 | 6/1967 | Bowles et al. | 73/180 |
| 3,365,955 | 1/1968 | Scudder et al. | 73/505 |
| 3,371,540 | 3/1968 | Colombani et al. | 73/505 |
| 3,372,596 | 3/1968 | Keller | 73/505 |
| 3,386,290 | 6/1968 | Egli | 73/505 |
| 3,407,828 | 10/1968 | Jones | 137/81.5 |
| 3,411,520 | 11/1968 | Bowles | 137/81.5 |
| 3,413,994 | 12/1968 | Sowers | 137/81.5 |

Primary Examiner—Samuel Scott
Attorney—Hurvitz, Rose & Greene

ABSTRACT: A self-adaptive system is provided capable of continuously adapting itself to compensate for changing operating conditions to which the apparatus is subjected. The system can be programmed to adjust to predictable operating condition changes and can, through self-adjustment, operate in an acceptable manner under conditions which cannot be predicted from prior knowledge of the performance envelope or environment. The control system includes a variable gain amplifier in which the gain can, for instance, be altered by a signal indicating an environmental change or by the very signal to be amplified or a derivative or integral of the signal to be amplified or by a condition related to the signal to be amplified.

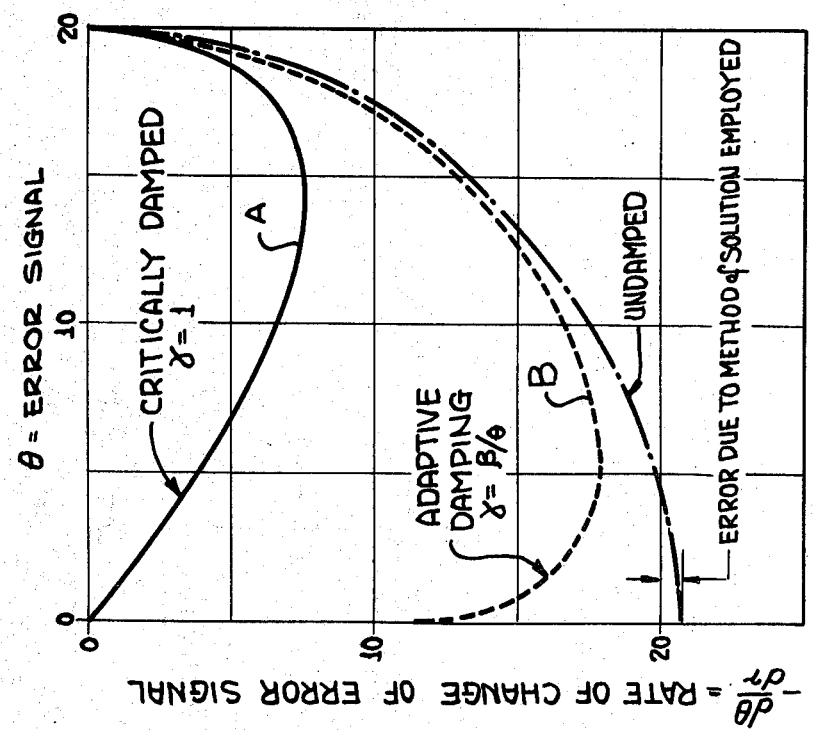
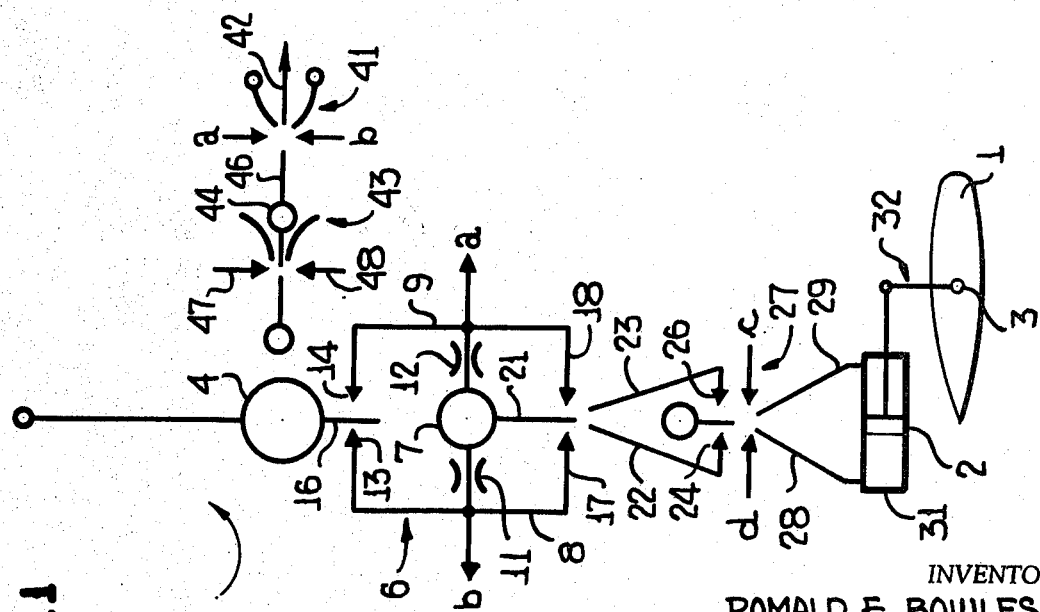
INVENTOR
ROMALD E. BOWLES

INVENTOR
ROMALD E. BOWLES

BY Hurvitz, Rose + Greene

ATTORNEYS

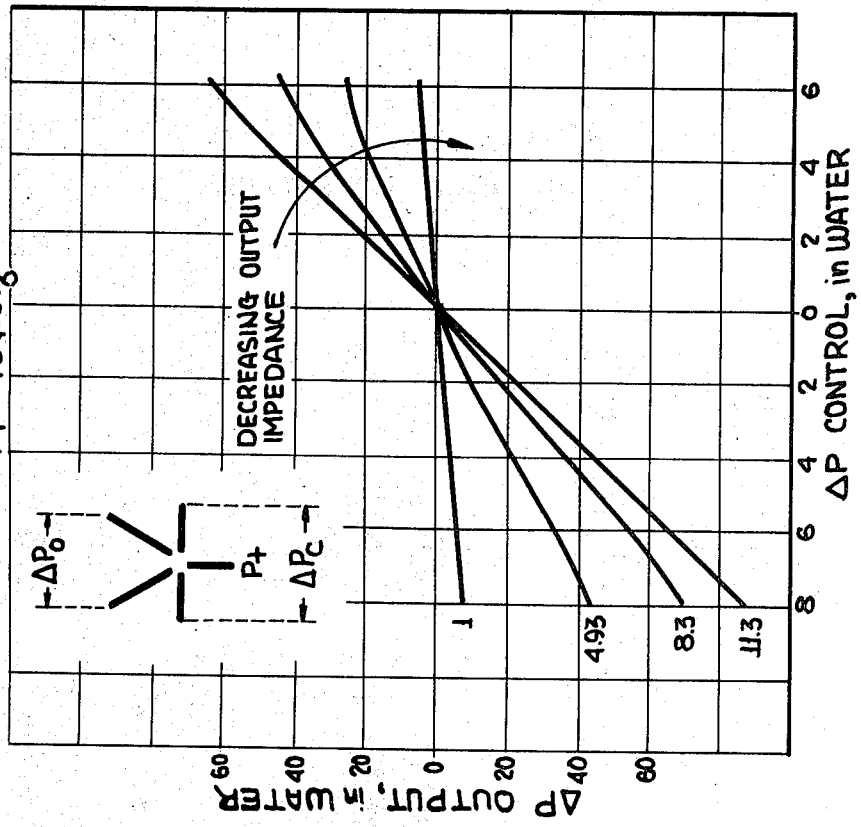
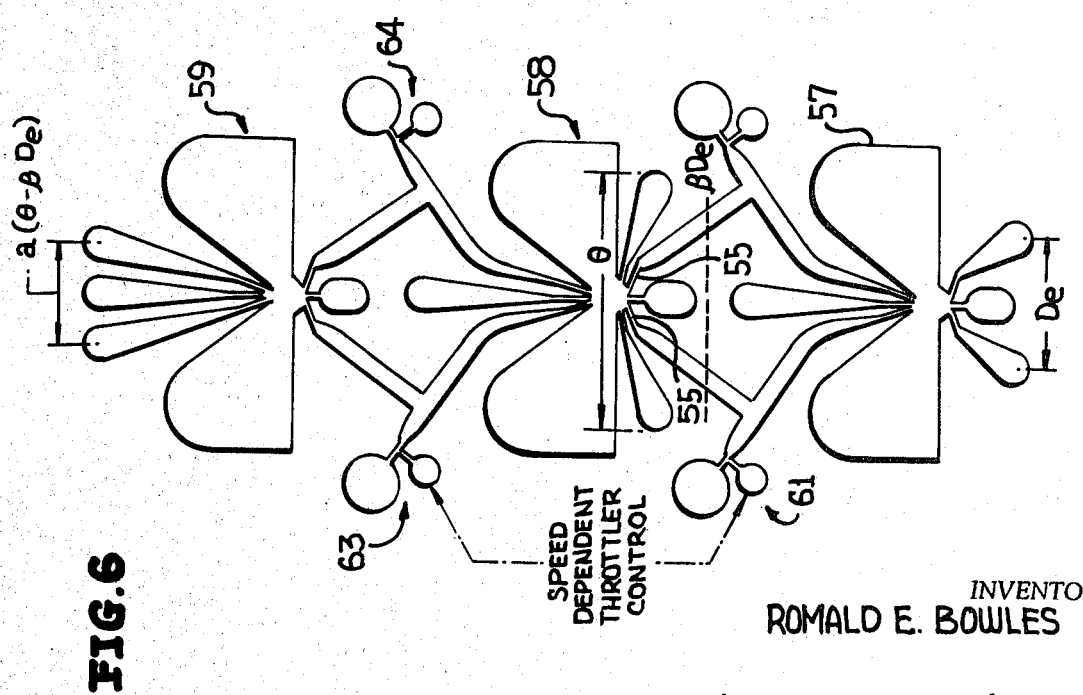

SELF-ADAPTIVE SYSTEMS

Although the invention is subsequently described in its full scope, for purposes of illustration the discussion is initially related to control of damping coefficients in a hydrofoil control system. In control of hydrofoils, it is normally desired to maintain the foils at a specific orientation relative to the surface of the water, which orientation is a function of the weight of the craft and load, the speed of the craft and other related factors. Some difficulty has been experienced due to instability produced by overshooting the desired orientation as a result of approaching the desired position too rapidly. In the prior art, there have been two basic approaches to adjustment of any device in its return to its programed position, whether this be a course or depth position. 2 position. These approaches have been to employ an unmodified error signal, which normally produces considerable overshoot; or to employ a signal modified to provide critical damping in which case the return to the proper position is relatively slow. The latter type of approach employs an equation of the type:

$$F = a\theta + b\frac{d\theta}{dt} \quad (1)$$

where $\theta$ stands for angular displacement and $b$ stands for the gain of the differentiating circuit. The difficulty, as indicated above, with this latter approach is that, although it greatly reduces hunting (oscillatory overshoot) about the control point, the response is relatively sluggish and serious position errors may be encountered. This is particularly hazardous in a hydrofoil craft, since sluggish response could permit the craft to go out of control at relatively high speeds.

The present invention provides a general approach to the problem of control and initially is applied for purposed purposes of illustration only to the hydrofoil control case. The approach employed to provide adaptive damping to a hydrofoil is to modify the damping factor in equation (1) above, as a function of position error, so that when the position error is large, the response of the system is rapid and much like the undamped response of the system. However, upon the error signal reducing in size, the system begins to behave more like a critically damp system so as to greatly reduce overshoot.

In the particular example under consideration, the apparatus would perform the function of equation (2) below:

$$F = a\theta + \frac{b}{|\theta|}\frac{d\theta}{dt} \quad (2)$$

In an equation of this type, when $\theta$ is large, the damping factor is small and the response of the system is primarily the response of the first term of the equation or simply $a\theta$, the error signal times a system constant $a$. However, as $\theta$ becomes smaller, that is, the apparatus or the craft is approaching its desired orientation, the second term becomes of increasing importance and the approach to the proper position is slowed and the control signal may be made to reverse its sign due to predominance of the second term.

There are several approaches to obtaining operation of this type, in a fluidic system. In one embodiment, the second term of the equation is derived by a vortex rate of turn sensor. The gain of the sensor is varied in a novel manner as a function of the displacement angle of the system so that the rate term is made to vary with the actual angular position of the craft relative to its desired angular position. In another aspect of the invention, a variable gain fluid amplifier, of the type described in copending application Ser. No. 480,674 by Edwin U. Sowers, III, filed on Aug. 18, 1965, U.S. Pat. No. 3,413,994 and assigned to the same assignee as the present invention, is employed with the angular displacement signal applied to the gain control orifice.

The adaptive control in the situation given above may be, in addition to error angle, a function of speed, direction of the water currents relative to the lift axis of the foils, fresh or salt water, load on the craft, etc.

The above and still further objects, features, and advantages of the present invention will become apparent upon consideration of the following detailed description of one specific embodiment thereof, especially when taken in conjunction with the accompanying drawings, wherein:

FIG. 1 is a schematic diagram of a first part of a control system;

FIG. 2 is a graph of the rate of change of error signal as a function of error signal for various types of control system;

FIG. 6 is a schematic diagram of an adaptive control system employing the variable gain amplifier of FIG. 5; and FIG. 7 is a graph of the various input versus output characteristics of a variable gain device.

Figure 3:
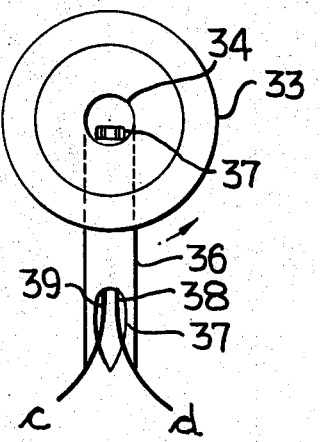
FIG. 3 is a schematic diagram of a variable gain vortex device for use in conjunction with the system of FIG. 1 in order to impart adaptive characteristics thereof.

Referring specifically to FIG. 1, there is illustrated part of a conventional hydrofoil (or craft) control system employing only angular displacement information. This system is employed to determine pitch of a hydrofoil craft and to initially maintain the pitch at a prescribed angle. The pitch control is effected in this case by control of a hydrofoil 1 through the intermediary of a fluid amplifier driven piston 2 employed to rotate a shaft 3 to which the foil 1 is connected. The angular position (pitch) sensing element, as illustrated in FIG. 1, is a pendulum 4, the position of which is sensed by a pure fluid differential pressure sensor generally designated by the reference numeral 6. Pressure sensor 6 comprises a pressure source 7 feeding two independent lines 8 and 9 through fixed restrictors 11 and 12, respectively. The lines 8 and 9 terminate at their upper ends, as illustrated in FIG. 1, in nozzles 13 and 14, respectively, positioned on opposite sides of and directed toward a plate 16 carried at the lower end of the pendulum. The lower end of the lines 8 and 9, as illustrated in FIG. 1, terminate in control nozzles 17 and 18 of a pure fluid proportional amplifier generally designated by the reference numeral 19. The amplifier 19 is provided with two output passages 22 and 23 which terminate in control nozzles 24 and 26 of a further pure fluid proportional amplifier 27. Amplifier 27 is provided with output passages 28 and 29 which enter a chamber 31 on opposite sides of the piston 2 disposed in the chamber 31. The piston 2 is connected via a linkage generally designated by the reference numeral 32, to shaft 3 of the hydrofoil 1, so that upon movement of the piston 2 to the right, as illustrated in FIG. 1, the hydrofoil 1 is rotated clockwise and, upon movement of the piston 2 to the left, the hydrofoil 1 is rotated counterclockwise.

In order to explain the operation of the apparatus, assume for the moment that the hydrofoil craft rotates counterclockwise about its pitch axis; that is, the bow of the craft rises, rotating counterclockwise about its pitch as illustrated by the arrow 33. The pendulum 4 rotates clockwise relative to the pressure sensor 6 carried on the craft and vane 16 approaches the nozzle 13 and recedes from the nozzle 14. In consequence, the pressure in line 8 rises and in line 9 decreases. The pressure at the control nozzle 26 increases while there is a decrease in pressure at the control nozzle 24 of the fluid amplifier 27. A greater fluid pressure and flow is now directed to the output passage 28 of the amplifier 27 while the flow and pressure in the passage 29 decreases. Thus, the piston 2 moves toward the right rotating the plane or foil 1 downwardly causing the bow of the ship to be lowered; that is, a clockwise rotation of the craft is produced countering the original counterclockwise rotation.

The device thus far described is of a completely undamped type. Specifically, the countering force is at all times equal to some constant of the system times the error. Further, the rate of correction of the system is a function of the system constants and not of the error signal so that maximum rate of correction is usually achieved at the instant of zero error signal and severe overshoot is inevitable. Referring now specifically to FIG. 2 of the accompanying drawings, there is illustrated a graph of the rate of change of error signal as a function of the error signal for three cases. The apparatus thus far described conforms to the undamped case and in the graph, it is assumed that there is initially a 20° error in the orientation of the bow of the hydrofoil craft. In the undamped case, the reaction of the system to this sudden disorientation of the craft is very rapid as indicated by the initial rate of rise of the curve. Further, a curve is produced having a very large area thereunder, indicating not only an initial rapid response to the error signal but a continued increase in rate of turn of the craft resulting in maximum rate at zero error signal.

The difficulty with an apparatus of the type illustrated in FIG. 1 is that the rate of change of error as a zero error is approached is very large so that overshoot of the desired or home position is inevitable and the system tends to oscillate about the desired position, in this case at zero error signal at some orientation of the craft about its pitch axis.

The phenomena of overshoot in one direction and overshoot in the opposite direction in response to the initial overshoot is known as hunting and it is the desire of most control systems to avoid excessive hunting. It is known to those skilled in the art to introduce a rate term into control systems so as to overcome this tendency to hunt. The equation for such a system is the equation (1) of the introduction and the response of a critically damped system, which is achieved by designing the system to provide appropriate values to constants $a$ and $b$ of equation (1), is plotted as one of the curves of FIG. 2. It is noted that, in the critically damped case as illustrated by the curve B of FIG. 2, the initial response of the system is just about the same as in the undamped case, but very shortly thereafter the response of the damped system begins to rapidly fall off and the system responds sluggishly. By controlling the factor $b$ of the rate portion of equation (2), the system may or may not be a critically damped system, and greater or lesser degrees of damping may be introduced. With less damping the curve tends to approach the undamped case as a limit and overshoot is relatively inevitable. If the system is overdamped, it becomes increasingly sluggish and no overshoot is introduced.

In the system to which the present invention is directed for purposes of illustration, there is provided, and reference is made to FIG. 3 of the accompanying drawings, a vortex rate sensor 33 is employed to produce the rate term of equation (1). The vortex rate sensor may be of the type described in my U.S. Pat. No. 3,320,815, issued on May 25, 1967, employing, however, as a readout device the lift sensing detector of U.S. Pat. No. 3,327,529 issued Jun. 27, 1967 in the names of Richard R. Windsor and Romald E. Bowles and assigned to the assignee of the present invention. In this device, the vortex rate sensor is mounted coaxially with the pivotal axis of the pendulum 4. Upon counterclockwise rotation of the craft; that is, lifting of the bow, fluid is caused to rotate counterclockwise in the vortex rate sensor. Vortex amplification produces a very rapid rate of rotation in the egress orifice 34 of the vortex rate sensor thus producing counterclockwise rotation in an output passage 36 connected to the egress orifice 34 at the bottom of the vortex device.

Located in the passage 36 is a foil 37 constituting the apparatus of the aforesaid U.S. Pat. No. 3,327,815. The device 37 is a lift sensor but, as used in this apparatus, determines a combination of flow rate and the degree of twist of the fluid in the passage 36. If the fluid were flowing axially of the passage, then two sensing ports 38 and 39 of the foil 37 would receive equal pressure. However, since the foil is offset from the center of the passage; that is, is located to one side of the axis of the passage 36, the angle of attack of the fluid relative to the core of the foil changes with rate and direction of rotation of the fluid. If the fluid is rotating counterclockwise, as is assumed for purposes of the present example, then the pressure in the passage 39 increases and the pressure in the passage 38 decreases. Conversely, if the fluid were rotating counterclockwise in the passage 36 as illustrated in FIG. 3, the pressure in the passage 38 would be higher than the pressure in the passage 39. Returning now to the example under consideration, and referring again to FIG. 2 as well as FIG. 3, if the craft rotates counterclockwise and the fluid in the vortex rate sensor 33 rotates counterclockwise initially, the pressure in the passage 39 increases relative to the pressure in the port 38. The sensor 37 is provided with two output passages $c$ and $d$, which are connected to control nozzles $c$ and $d$ of the fluid amplifier 27 of FIG. 1. The signal introduced by the rate device initially adds to the angle error signal but reverses as soon as the direction of rotation of the craft is reversed even though the error signal is still large. Specifically, the rate of rotation of fluid in sensor 33 reverses and the pressure in passage 38 exceeds that in passage 39 and the differential pressure across nozzles $d$–$c$ opposes that across nozzles 26–24.

In consequence, the apparatus of FIG. 3 introduces a rate function into the control loop and with the proper gain of the apparatus, a critically damp or nearly critical damp control function, such as illustrated by curve A of FIG. 2, is provided. It should be noted that the foil 37 may include its own amplifier, as disclosed in the aforesaid application, so as to match signal levels at the control nozzles of the amplifier 27. The addition of an amplifier affects the factor $b$ in equation (1), this factor now being a function of the gain of the vortex sensor 33 and the additional amplifier.

Referring again to FIG. 2 of the accompanying drawing, it is an object of the invention to employ adaptive damping techniques to provide a curve such as curve B illustrated in FIG. 2 which is a curve of an adaptively damped system. The advantage to a control function such as that illustrated by the adaptive damping curve is that the initial response of the apparatus is substantially the same as in the undamped case, providing rapid initial response, while the long term response rapidly approaches the damped case. Specifically, the initial rapid response is followed by a rapidly decreasing response (rate of turn) as the zero position is approached so that overshoot is substantially reduced or eliminated and the dangers inherent in hunting are greatly reduced.

In accordance with one aspect of the present invention, adaptive damping is achieved by controlling the gain in the rate portion of the circuit as a function of displacement or angular displacement signal; that is, the error signal of FIG. 2. Before discussion of the exact manner in which this is achieved in the apparatus illustrated in FIG. 3, it is necessary to understand how the gain of a vortex amplifier may be varied, in this case by varying the input pressure to the device. Normally, the gain of a vortex amplifier is not appreciably sensitive to input pressure. However, by employing suitable sensors as for example a lift sensor, the gain of the device can be made dependent upon input pressure to the vortex sensor. In the following analysis, it is assumed that the tangential velocity in the vortex rate sensor is very small compared with the radial velocity and thus the angle of the resultant velocity is small relative to the radial velocity. Incidentally, this is true over the normal range of operation of a vortex rate sensor, since any rate of rotation which exceeds 15° or 20° per second is considered a relatively dangerous condition. Since the angle between the velocity resultant and the radial velocity is small, the tangent of the angle, which is herein designated as $\alpha$, is substantially equal to the angle itself. The tangent of alpha $$\operatorname{Tan} \alpha = \frac{V_t}{V_r}$$

where $V_t$ is tangential velocity and $V_r$ is radial velocity in the vortex chamber. The angle of interest is actually the angle of attack relative to the lift sensor, element 37, and to accommodate changes in flow conditions as between the chamber 33 and the passage 36, a constant C is employed. Thus $$\operatorname{Tan} \alpha = C \frac{V_t}{V_r} \qquad (3)$$

The differential in pressure appearing across the passages 38 and 39 is expressed by equation (4) below:

$$\Delta P = \alpha q \qquad (4)$$

where $q$ is the dynamic pressure of fluid flow in the passage 36. As is well known, $$q = \tfrac{1}{2}\gamma V^2 \quad (5)$$

and substituting equation (5) in equation (4):

$$\Delta P = \tfrac{1}{2}\gamma V^2 \tan \alpha \quad (6)$$

Substituting equation (3) in equation (4), we now have $$\Delta P = \tfrac{1}{2}\gamma V^2 C \frac{V_t}{V_r} \quad (7)$$

However, since $V_t$ is considerably smaller than $V_r$, an approximation that $V^2$ is equal to $V_r^2$ is made and equation (7) now becomes $$\Delta P = \tfrac{1}{2}\gamma V_r V_t C \quad (8)$$

To simplify the equation further, and gathering the constants $$\Delta P = K V_r V_t \quad (9)$$

It is now apparent that the signal produced by the detector 37 is equal to some constant K times the radial velocity times the tangential velocity for rate of rotation within specified limits. The output signal now becomes a function of the radial velocity, which in turn is a direct function of the input pressure to the apparatus.

Referring now to equation (2), the adaptive damping capability may be achieved if the factor $b$ is considered the gain of the rate sensor portion of the apparatus and this gain is varied as a function of the error displacement produced by the pendulum 4 and the sensing circuit 6.

The supply pressure to the vortex rate sensor 33 is derived from an analog amplifier 41, having three output passages, a center passage 42 which supplies pressure to the vortex rate sensor 33 and two other passages disposed on opposite sides of the passage 42 and employed as dump passages. The amplifier 41 is provided with two input control nozzles $a$ and $b$ which derive signals from the lines 8 and 9, respectively, of FIG. 1. If now there is a differential pressure between the lines 8 and 9, the pressure and flow rate of the fluid supplied to the vortex rate sensor 33 is decreased.

It will be noted that in equation (2) the error signal as applied to the rate portion of the system is absolute value; that is, the gain is reduced as the error signal increases, regardless of the sign of the error. This is achieved by the amplifier 41 since there is no difference of operation of the circuit regardless of the sign of the control signal. The rise in the signal produces deflection of the stream from the output passage 42 by a predetermined amount which is a function of the signal and thus, the flow and pressure to the vortex rate sensor are reduced regardless of the direction of deflection of the stream.

Referring now again to FIG. 2, as well as FIG. 3, if the vehicle initially rotates counterclockwise, the rotation in the vortex chamber 33 is clockwise and produces a positive signal at the output passage $c$ of the sensor 37 relative to its passage $d$. Thus, the error and rate signals add to produce a rapid counter rotating effect, which response is tempered by the decrease of the gain of the vortex amplifier as error signal increases to correct the position of the foil 1 to overcome the undesired rotation of the craft. Once the craft begins to rotate in the opposite direction; that is, to rotate back toward its initial position even though it is still materially displaced (20° in the example) from its initial position, the fluid in the vortex chamber 33 reverses its direction of rotation and the signal supplied by the sensor 37 begins to oppose the signals supplied by the position detector or pendulum 4. However, while the signal error is large, the gain of the vortex amplifier 33 is small and the opposition to the corrective action provided by the pendulum 4 and sensor 6 and subsequent circuits is reduced only to a small extent by the rate sensor action. As the craft begins to approach its desired position and the signal across the control nozzles $a$ and $b$ of the amplifier 41 of FIG. 3 is reduced, the gain of the vortex rate sensor portion of the circuit rises rapidly introducing a large damping factor into the system materially reducing the rate of turn of the craft so as to prevent overshoot. As the craft approaches its zero position, the signals from the foil sensor 37 predominate so that the foil 1 is now countering the rotation of the craft to thereby overcome its momentum, greatly reduce its rate of rotation and the tendency to overshoot and hunt.

Figure 4:
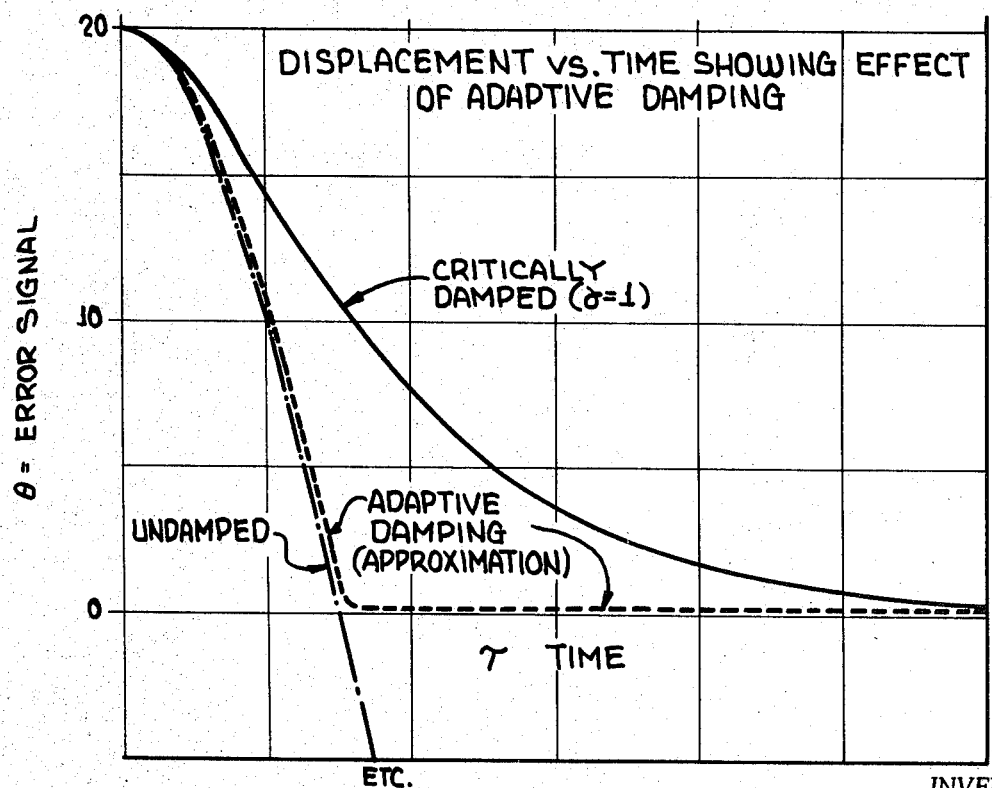
FIG. 4 is a graph of error signal as a function of time of various types of control systems.

Referring now to the curves of FIG. 4 of the accompanying drawings, the error signal as a function of time is illustrated for the three cases, the undamped, the critically damped and the adaptively damped system. In the undamped case, the rate of return to the zero position is quite fast but, as a result, the craft is rotating as it approaches zero error, at a rapid rate, and the craft overshoots the zero position. In the critically damped case, the rate of return toward the zero axis is very slow, but overshoot is substantially eliminated. In the adaptive damping case the rate of return toward the zero axis is very rapid, but as the axis is approached, the rate of return is greatly reduced and becomes almost asymptotic to the zero position. As a result, substantial return to the zero position is effected in a very short time and the individual controlling the craft can make the minor additional adjustments necessary to bring the craft back to its actual zero position.

It may be desired in a situation such as that illustrated in FIGS. 1 and 3 to provide additional gain control in the rate loop. Specifically, the response of the system should be a function of speed of the craft. Obviously, if the craft is going quite slow, relatively large corrections on the foil 1 will not produce a severe turning condition, whereas if the speed of the craft is great, the response of the system must be somewhat tempered to prevent dangerous angular accelerations. The speed function, for instance, may be introduced via an amplifier 43, having a central output passage 44 feeding the power nozzle of the amplifier 41. The amplifier 43 is provided with opposed control nozzles 47 and 48. A signal indicative of the speed of the craft may be provided to the nozzle 47. As the speed of the craft increases, the signal applied to the nozzle 47 increases and the amount of fluid flowing to the amplifier 41 is reduced thereby reducing the gain of the vortex rate sensor system. The control nozzle 48 may be employed to provide a bias for the amplifier 43 or may be employed to introduce a factor which is in opposition to the speed factor; that is, as the speed goes up, some other factor may require a less sluggish response for that speed than would be indicated by speed alone. Thus, as the craft becomes more fully loaded, it may be desired to increase the turning moment produced by the foil 1 for a given speed over that which can be permitted when the craft is unloaded. In consequence, this signal may be employed as an opposing signal for higher speeds and would not normally be employed at low speeds.

Figure 5:
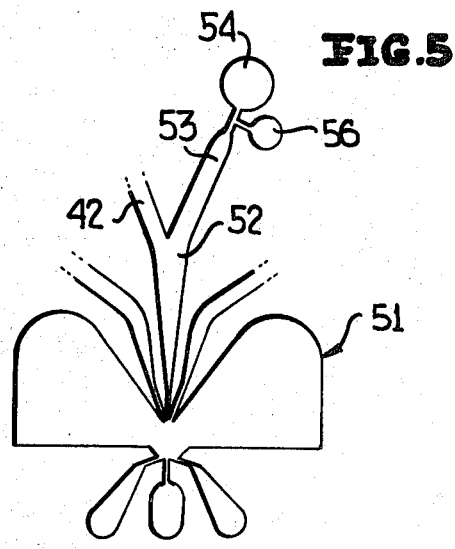
FIG. 5 is a diagram of a variable gain fluid amplifier.

A speed control function may be introduced directly into the amplifier 41 by employing the amplifier of the aforesaid U.S. Pat. application Ser. No. 480,674 to Sowers et al. Specifically, and reference is made to FIG. 5 of the present application, the center output channel 42 of the proportional amplifier 41 of FIG. 3 is branched as at 52 to provide the output channel 42 and a throttling channel 53. The flow divides between the two channels in some predetermined portion depending upon the cross-sectional area and downstream loading of the passages 42 and 53. The passage 53 is provided with a venturi region 54 into which is directed a passage 56 at substantially right angles to the longitudinal axis of the passage 53. By applying a speed control signal to the passage 56, the impedance of the passage 53 may be variably increased and may at high signals become for all practical purposes substantially infinite causing all flow at the junction 52 to be directed to passage 42. Thus, the pressure and flow to the passage 42 may be controlled by signals applied to the passage 56 and the gain of the vortex rate sensor 33 and its associated system circuits thus varied. In this particular instance, the fluid supplied to the passage 56, if the fluid is to represent speed, must be varied as an inverse function of the speed, so that as speed rises, the gain of the vortex rate sensor is reduced by allowing more fluid to be diverted to the passage 53 than at the lower speeds.

The concepts of the present invention may be applied directly to the fluid circuitry of FIG. 1 by introducing adaptive gain control into the error signal amplifier claim. However, for purposes of providing greater scope to the invention, an additional factor is added to the considerations thus far under observation. Specifically, consider the case where it is desired to control both the depth of the hydrofoil 1 and the pitch of the craft. Depth could be sensed by the depth sensor of U.S. Pat. No. 3,263,501 in conjunction with the apparatus of FIG. 1 to provide position as well as angle sensing.

Referring specifically to FIG. 6 of the accompanying drawings, there is provided an apparatus having a first fluid amplifier 57, a second fluid amplifier 58 and an output amplifier 59. The amplifiers 57 and 58 have throttler mechanisms on their output passages to provide controllable amplifier gain variations. The equation to be solved or with which the apparatus is intended to conform is equation (10)

$$P = a(\theta - \beta D_e) \qquad (10)$$

where $\theta$ is the pitch angle, $D_e$ is the depth error and $a$ and $\beta$ are amplification factors. The factor $D_e$; that is, depth error, is applied to the control passages of the amplifier 57, the output of the amplifier being applied to one set of control passages 55 of the amplifier 58. The other control passages 60 of the amplifier 58 are provided with angle error $\theta$ and the output of the amplifier 59 which is really an amplified function of its input is the equation (10).

If now a speed dependent signal is applied to throttler mechanisms 61 and 62, associated with the amplifier 57, and 63 and 64 associated with the amplifier 58, the gain factors $a$ and $\beta$ may be varied in accordance with speed of the craft. As a result of this variation of gain with speed, the set of curves of FIG. 7 may be produced. The pressure gain of the system varies in the examples covered by the curves of FIG. 7 between approximately 1 and 11.3 in four different steps, depending upon the speed of the craft. The response of the overall system is thus tailored to a particular characteristic which is subject to change under various operating conditions. In the example, the factor is speed, but the factor such as load, angle of the currents relative to the chord of the foil 1 and associated foils, wave height and other factors which may be of concern in the environmental operating conditions of the craft, may be applied to the system through throttler such as 62 and 64 of FIG. 6. Further, and reference is again made to FIG. 3, control signals may be applied directly to the rate sensor 33 through control passages 66 and 67 so long as the system gain relative to these factors is to be varied as with respect to rate of turn.

The operation of this type of apparatus is not limited to craft orientation, although its uses in such a situation readily lend themselves to explanation. Thus, the concepts employed herein are useful in furnace temperature control, machine tool control and, in fact, in control systems in general where there is need for a system response that may be varied with changing conditions.

While I have described and illustrated one specific embodiment of my invention, it will be clear that variations of the details of construction which are specifically illustrated and described may be resorted to without departing from the true spirit and scope of the invention as defined in the appended claims.

I claim:

1. A self-adaptive control apparatus for responding to deviations of operating conditions of a system to be controlled from a predetermined operating condition, said apparatus intended to return said system to be controlled to said predetermined operating condition, means for generating a plurality of signals each indicative of the condition of one a different of a plurality of variable interrelated operating parameters of said system to be controlled, a first signal of said plurality of signals being functionally related to said deviations of said system from said predetermined operating condition, amplifying means for generating a first output signal having a signal component related to said first signal, said amplifying means having an input versus output signal gain which may be varied, control means responsive to a second signal of said plurality of signals for varying said gain of said amplifying means, an amplifier responsive to said first output signal and to said second signal to produce a control signal having components related to both said first output signal and said second signal, and means responsive to said control signal to reduce deviations of said system from said predetermined operating condition.

2. A self-adaptive control apparatus according to claim 1 wherein said amplifier has an input signal versus output signal gain which may be varied, control means responsive to a signal to vary said gain of said amplifier, and means for applying said second signal to said control means of said amplifier and said amplifying means.

3. A self-adaptive control apparatus according to claim 2 wherein said amplifier comprises first signal input means for receiving said first output signal and second signal input means for receiving a further input signal having a component related to a further of said plurality of signals generated by said means for generating whereby to produce control signals of the form $a(x-\beta De)$ where $a$ is the instantaneous gain factor of said amplifier as varied by said second signal, $\beta$ is the instantaneous gain factor of said amplifying means as varied by said second signal, $x$ is said further signal and $De$ is said first signal.

4. A self-adaptive control apparatus according to claim 1 wherein said means for generating said first signal comprises means for generating a signal whose amplitude and sense varies with the rate and direction of deviation of said system from said predetermined operating condition, wherein said means for generating said second signal comprises means for generating a signal whose amplitude and sense varies with the amplitude and sense of the deviation of said system from said predetermined operating condition and wherein said control means of said amplifying means comprises means responsive to said amplitude only of said second signal whereby is generated a control signal of the form $ax +$         where $x$ is said second signal, $a$ is a constant of the means for generating said second signal,         is said first signal and $b$ is the gain of said amplifying means in the absence of said second signal.

5. A self-adaptive control apparatus according to claim 4 wherein said means for generating said first signal comprises means for producing a signal having as a sense and amplitude which is a function of the angular deviation of a body from a predetermined direction.

6. A self-adaptive control apparatus according to claim 4 wherein said amplifying means comprises a vortex rate of turn sensor having a vortex chamber, means for supplying fluid to said vortex chamber and an egress orifice for said chamber, said control means for said amplifying means comprising means for varying the rate of mass flow of fluid to said vortex chamber.

7. A self-adaptive control apparatus according to claim 6 wherein said means for varying the rate of mass flow comprises an analog fluidic amplifier having a power nozzle, a first output passage axially alined with said power nozzle and connected to supply fluid to said vortex chamber and control means for selectively deflecting fluid issued by said power nozzle and means for applying said second signal to said control means of said analog amplifier.

8. A self-adaptive control apparatus according to claim 7 further comprising a further fluidic amplifier having a power nozzle for issuing a steam of fluid, at least an output passage for receiving fluid from said power nozzle and a control nozzle for issuing fluid against said stream of fluid to vary the quantity of fluid directed to said at least one output passage from said power nozzle, means for supplying to said control nozzle of said further amplifier a further signal produced by said means for generating and means connecting said one output passage to said analog fluidic amplifier to vary the quantity of fluid received by said first output passage of said fluidic amplifier.

9. A self-adaptive control apparatus for responding to deviations of operating conditions of a movable body to be controlled from a predetermined operating condition, said apparatus intended to return said body to be controlled to said predetermined operating condition, means for generating a first signal having an amplitude and sense determined by the rate and direction of deviation of said body from said predetermined operating condition, means for generating a second signal having an amplitude and sense determined by the amplitude and direction of deviation of said body from said predetermined operating condition, amplifying means for generating a first output signal having a signal component related to said first signal, means for applying said first signal to said amplifying means for amplification thereby, said amplifying means having an input versus output signal gain which may be varied, control means responsive to the absolute value of said second signal for varying said gain of said amplifying means, a summing amplifier responsive to said first output signal and to said second signal to produce a control signal having components related to both said first output signal and said second signal, means for applying said first output signal and said second signal to said summing amplifier for amplification thereby, and means responsive to said control signal to reduce deviations of said body from said predetermined operating condition.

10. A self-adaptive control apparatus for responding to deviations of operating conditions of a movable body to be controlled from a predetermined operating condition, said apparatus intended to return said body to be controlled to said predetermined operating condition, means for generating a first signal having an amplitude and sense determined by the amplitude and direction of deviation of said body from a predetermined operating condition, means for generating a second signal having an amplitude determined by the speed of said movable body, amplifying means for generating a first output signal having a signal component related to said first signal, said amplifying means having an input versus output signal gain which may be varied, control means responsive to said second signal for varying said gain of said amplifying means, a summing amplifier responsive to said first output signal and to said second signal to produce a control signal having components related to both said first output signal and said second signal, and means responsive to said control signal to reduce directional deviations of said body from said predetermined operating condition.

UNITED STATES PATENT OFFICE
CERTIFICATE OF CORRECTION

Patent No. 3,542,048                Dated November 24, 1970

Inventor(s) Romald E. Bowles

It is certified that error appears in the above-identified patent and that said Letters Patent are hereby corrected as shown below:

Claim 1, column 7, line 74, should read as follows:

"signals each indicative of the condition of a different one of a".

Claim 4, column 8, line 42, should read as follows:

"generated a control signal of the form $ax + \dfrac{b}{|x|} \dfrac{dx}{dt}$ where x is".

Claim 4, column 8, line 44, should read as follows:

"said second signal, $\dfrac{dx}{dt}$ is said first signal and b is the gain of".

Signed and sealed this 31st day of August 1971.

(SEAL)
Attest:

EDWARD M. FLETCHER, JR.          WILLIAM E. SCHUYLER, JR.
Attesting Officer                 Commissioner of Patents